May 4, 1971
C. S. SMITH ET AL
3,577,221
HYDROGEN MANUFACTURE
Filed Dec. 31, 1968
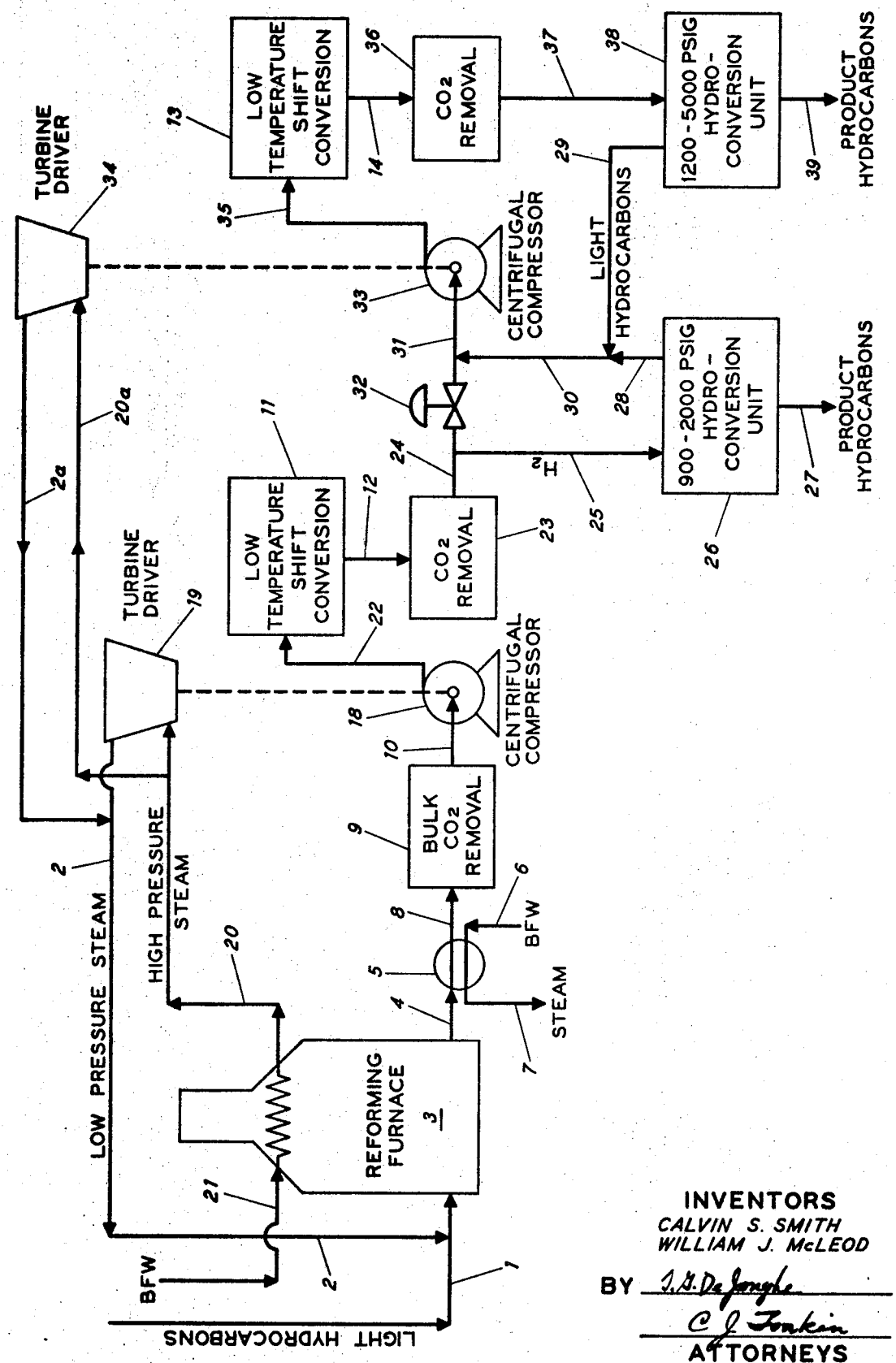
INVENTORS
CALVIN S. SMITH
WILLIAM J. McLEOD
BY *J. J. De Jongke*
*C. J. Tonkin*
ATTORNEYS

# United States Patent Office 3,577,221
Patented May 4, 1971

3,577,221
HYDROGEN MANUFACTURE
Calvin S. Smith and William J. McLeod, El Cerrito, Calif., assignors to Chevron Research Company, San Francisco, Calif.
Continuation-in-part of application Ser. No. 736,520, May 17, 1968, which is a continuation-in-part of abandoned application Ser. No. 665,106, Sept. 1, 1967. This application Dec. 31, 1968, Ser. No. 788,300
Int. Cl. C01b 1/02, 1/18
U.S. Cl. 23—213
7 Claims

ABSTRACT OF THE DISCLOSURE

According to the present invention a process is provided for producing high pressure hydrogen which comprises:

(a) generating a hydrogen-rich gas stream containing CO and $CO_2$;
(b) removing $CO_2$ from the hydrogen-rich gas stream to obtain a $CO_2$ lean, hydrogen-rich gas stream;
(c) centrifugally compressing the $CO_2$-lean, hydrogen-rich gas stream to a pressure of above about 400 p.s.i.g.; and
(d) reacting CO contained in the $CO_2$-lean, hydrogen-rich gas stream with $H_2O$ at a pressure of above about 400 p.s.i.g.

Preferably $CO_2$ is removed from the hydrogen obtained after step (d) and the purified compressed hydrogen is used in a hydroconversion process.

CROSS-REFERENCES

This application is a continuation-in-part of Ser. No. 736,520, filed May 17, 1968, which in turn is a continuation-in-part of Ser. No. 665,106, filed Sept. 1, 1967, now abandoned.

BACKGROUND OF THE INVENTION (1) Field of the invention

This invention relates to processes for the production, compression, and purification of gases; and, more particularly, it relates to a process for supplying high pressure, high purity hydrogen gas at elevated pressure. In a still more particular aspect, the invention relates to a process for obtaining high pressure, high purity hydrogen for use in a hydroconversion process. By hydroconversion process is meant a process wherein hydrogen is reacted with hydrocarbons so as to convert the hydrocarbons to more desirable hydrocarbons or hydrocarbon products.

(2) Description of the prior art (A) Means for obtaining raw, hydrogen-rich gas: There are a number of current processes available for the production of raw hydrogen. Many of these processes use hydrocarbons as a source of hydrogen. Two of the most widely practiced methods of obtaining raw, hydrogen-rich gas are steam reforming and partial oxidation.

In typical steam reforming processes, hydrocarbon feed is pretreated to remove sulfur compounds which are poisons to the reforming catalyst. The desulfurized feed is mixed with steam and then is passed through tubes containing a nickel catalyst. While passing through the catalyst-filled tubes most of the hydrocarbons react with steam to form hydrogen and carbon oxides. The tubes containing the catalyst are located in a reforming furnace, which furnace heats the reactants in the tubes to temperatures of 1,200–1,700° F. Pressures maintained in the reforming furnace tubes range from atmospheric to 450 p.s.i.g. If a secondary reforming furnace or reactor is employed, pressures used for reforming may be as high as 450 p.s.i.g. to 700 p.s.i.g. In secondary reformer reactors, part of the hydrocarbons in the effluent from the primary reformer is burned with oxygen. Because of the added expense, secondary reformers are generally not used in hydrogen manufacture but are used where it is desirable to obtain a mixture of $H_2$ and $N_2$, as in ammonia manufacture. The basic reactions in the steam reforming process are:

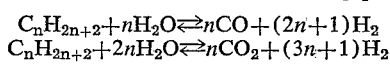

e.g., methane-steam:

and

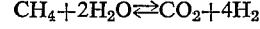

Because the hydrogen product is used in high-pressure processes, it is advantageous to operate at high pressure to avoid high compression requirements. However, high pressures are adverse to the equilibrium; and higher temperatures must be employed. Consistent with hydrogen purity requirement of about 95 to 97 volume percent $H_2$ in the final $H_2$ product and present metallurgical limitations, generally the single stage reforming is limited commercially to about 1,550° F. and 300 p.s.i.g.

In typical partial oxidation processes, a hydrocarbon is reacted with oxygen to yield hydrogen and CO. Insufficient oxygen for complete combustion is used. The reaction may be carried out with gaseous hydrocarbons or liquid or solid hydrocarbons; for example, with methane, the reaction is:

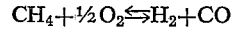

With heavier hydrocarbons, the reaction may be represented as follows:

Both catalytic and noncatalytic partial oxidation processes are in use. Suitable operating conditions include temperatures from 2,000° F. up to about 3,200° F., and pressures up to about 1,200 p.s.i.g., but generally pressures between 100 and 600 p.s.i.g. are used. Various specific partial oxidation processes are commercially available, such as the Shell Gasification Process, Fauser-Montecatini Process, and the Texaco Partial Oxidation Process.

There is substantial CO in the hydrogen-rich gas generated by either reforming or partial oxidation. To convert the CO to $H_2$ and $CO_2$, one or more CO shift conversion stages are typically employed. The CO shift conversion reaction is:

This reaction is typically effected by passing the CO and $H_2O$ over a catalyst such as iron oxide activated with chromium. The reaction kinetics are faster at higher temperature, but the equilibrium to hydrogen is favored by lower temperatures. Therefore, it is not uncommon to have a high temperature shift stage followed by a low temperature shift stage. Pressure has little bearing on the equilibrium in the water-gas shift reaction.

(B) $CO_2$ or $CO_2+H_2S$ removal: Because most hydrogen-using processes, particularly hydroconversion processes, operate more efficiently with high purity hydrogen, it is generally required to remove impurities, such as $CO_2$, from the raw hydrogen generated in the hydrogen plant before the hydrogen is passed to the hydrogen-using process. Perhaps the most widespread method of removing $CO_2$ from other gases is the absorption of $CO_2$ in an alkanolamine, such as diethanolamine (DEA) or monoethanolamine (MEA). Largely because of its relatively low molecular weight, MEA is generally the preferred absorbent of the alkanolamines. The $CO_2$ forms a loose chemical bond with the amine when it is absorbed.

In using any of the commonly used alkanolamine absorbents, an absorber and stripper are typically arranged in a figure eight process configuration. The $CO_2$-containing gas is fed into the bottom of the absorber where $CO_2$ is absorbed in downward flowing absorbent. Purified gas with the $CO_2$ removed leaves the top of the absorber. Rich absorbent from the bottom of the absorber is passed to the top of a stripping column where it is regenerated as it passes from the top to the bottom of the stripping column. The regenerated absorbent passes from the bottom of the stripper to the top of the absorber to complete the figure eight path of the absorbent as it flows down through the absorber trays, or packing material, absorbing $CO_2$. A large amount of heat is required to strip the $CO_2$ from the MEA absorbent which is typically used because of the chemical bond that occurs between the $CO_2$ and the MEA. For instance, in a large hydrogen plant producing $135 \times 10^6$ standard cubic feet per day of hydrogen, over $300 \times 10^6$ B.t.u.'s per hour are generally required to reboil the MEA in order to effect the regeneration of the MEA. These $300 \times 10^6$ B.t.u.'s per hour are equivalent to over 1,000,000 dollars per year in terms of steam (at a value of about 40 cents per thousand pounds) that could be generated.

Over a period of time, a considerable amount of MEA will be lost out the top of the absorber as large volumes of gas carry entrained MEA out the top of the absorber in spite of preventive measures. Further MEA is lost due to pumping losses as large volumes of absorbent are required and therefore circulated to remove the great quantities of $CO_2$ that are typically formed in modern hydrogen production plants. Other common $CO_2$ absorption systems—for example, hot carbonate—are generally similar to the alkanolamine system in the respects described above with only moderate reduction in regeneration heat requirements.

Since the alkanolamine absorbents tend to degrade, a "reclaimer" is commonly used to purify the absorbent. The reclaimer is essentially a small reboiler. It is fed a slipstream of the absorbent from the bottom of the stripper. Only that portion of the slipstream that is vaporized is returned to the stripper system. Heavy tarry material collects in the bottom of the reclaimer and is periodcially withdrawn and passed to sewerage as a spent alkanolamine stream. Common practice is to clean the reclaimer as frequently as once a week. The cleaning procedure typically involves taking the reclaimer off-stream, draining the spent alkanolamine and heavy tarry material, and steam cleaning the reclaimer.

It is thus apparent that cleaning the reclaimer will result in losses of absorbent in addition to those losses caused by entrainment and pumping leakage. Although the alkanolamine is expensive, this cleaning procedure is necessary to avoid build-up of corrosive bodies in the $CO_2$ absorption system. Corrosion, which would be worse without the reclaimer, still is a considerable problem in the alkanolamine $CO_2$ absorption systems.

(C) Compression of high purity hydrogen: Some of the processes which use high purity hydrogen as a reactant are: hydrodesulfurization, operating at pressures between about 100 and 1,500 p.s.i.g.; hydrotreating, operating at pressures between about 200 and 2,000 p.s.i.g.; hydrocracking, operating at pressures between about 450 and 3,000 p.s.i.g.; and thermal hydrodealkylation, operating at pressures between about 450 and 1,000 p.s.i.g. All of these just-mentioned hydroconversion processes may operate at even higher pressures (for example, up to 1,000 p.s.i.g.) than just given but seldom will operate at pressures lower than the range given. Thus it can be seen that many of the processes which use hydrogen require the hydrogen at a high pressure, which in most cases means generated hydrogen gas must be compressed before being passed to a hydrogen-using process.

Basically, all compressors may be considered as belonging to one of two categories; i.e., their principles involve either that of true mechanical compression (positive displacement) or centrifugal compression. Compressors utilizing true mechanical compression are so considered because the act of volumetric reduction is accomplished by means of a compressing element. The compression element may be in the form of a piston which in its particular motion entraps and displaces gas within a suitably designed and fully enclosed housing. Motion may be reciprocating during which the element, in the form of a piston, passes back and forth within dimensional limits over the same course within a cylinder in a straight-line direction.

Centrifugal compression is accomplished by "centrifugal" force exerted on an entrapped gas during rotation of an impeller at high speed. Most centrifugal compressors depend primarily on "centrifugal" force and high tangential velocity of the fluid in the periphery of the impeller (or rotors or blades in the instances of some turbocompressors) to produce the desired head or discharge pressure. In this specification, the terms "centrifugal compression" or "compressor" are meant to include turbine compression or turbocompressors, including, for example, axial-flow compressors. In the broad sense of centrifugal compression used herein, compression is generally effected, at least to a substantial degree, by conversion of velocity head to pressure head.

The reciprocating compressor is used for hydrogen compression, but it has some severe disadvantages, particularly for large-size plants:

(1) All parts are subject to unbalanced, reciprocating stresses; and foundations, frames and other parts must be large. To minimize vibration, speeds are low (400–700 r.p.m.); and capacity is low. Therefore, in large plants, several machines are required. Cost of installing, instrumenting, protecting and piping several machines is high. Considerable land is required, and plants are bigger and more complex, making them more difficult to control.

(2) The reciprocating machine is less reliable than centrifugal machines, and it is common practice to design plants with one or two expensive spare machines ready to come on-stream in the event of a failure.

(3) The reciprocating machine produces a pulsating gas supply which sonically transmits vibration to piping instruments and other plant facilities. Such vibrations can cause hazardous failures with hydrogen at high pressure.

(4) The low speed of reciprocating compressors tends to limit prime movers to low speed, electric motors or gas engines. While it is possible to use high speed steam or gas turbines, large reduction gears must be used. The pounding of the reciprocating loads has led to poor experience with these units. Hydrocracking and hydrogen manufacturing processes can be designed to produce byproduct steam if it could be used in steam turbine drivers. However, for the reasons just given, this byproduct steam is generally not used to drive the reciprocating compressors.

(5) Reciprocating compressors are particularly susceptible to severe damage if liquid is present in the gas being compressed.

By comparison, centrifugal compressors are reliable, rugged, in most cases relatively simple, have large capacities, are relatively small, have balanced stresses, and generally cause relatively little vibration or pulsation in the plants. They can be driven by high speed, steam turbines or gas turbines.

However, centrifugal compressors cannot, with any reasonable degree of feasibility, be used as high purity hydrogen compressors.

Compression ratios (ratio of discharge pressure to inlet pressure for one stage of compression) obtainable with a centrifugal compressor are a function of the molecular weight of the gas to be compressed. With pure hydrogen having a molecular weight of 2, compression ratios are limited to about 1.025. Because of this low compression ratio for hydrogen, centrifugal compressors are not practical to date for compression of high purity hydrogen.

Table I below illustrates the sharp decrease in compression ratio for centrifugal compression as the molecular weight of the gas being compressed decreases. The number of stages used in the compression is the same for each case in Table I.

TABLE I

| | | | |
|---|---|---|---|
| Barometer, p.s.i.a | 14.4 | 14.4 | 14.4 |
| Inlet temperature, °F | 60.0 | 60.0 | 110.0 |
| K. (Cp./Cv. for inlet gas) | 1.11 | 1.398 | 1.36 |
| Inlet capacity, c.f.m | 20,000.0 | 20,000.0 | 20,000.0 |
| Head, ft.-lb. per lb | 22,000.0 | 22,000.0 | 22,000.0 |
| Molecular weight | 63.0 | 28.95 | 10.1 |
| Inlet pressure, p.s.i.a | 16.73 | 14.73 | 14.08 |
| Discharge pressure, p.s.i.a | 79.53 | 29.73 | 17.99 |
| Compression ratio | 4.75 | 2.01 | 1.28 |

As previously indicated, it is not practical to use centrifugal compressors to compress high purity hydrogen to high pressures because of the multitude of stages that would be required. For example, the centrifugal compression ratio (ratio of discharge pressure to inlet pressure for one stage of centrifugal compression) with hydrogen, molecular weight of 2, is limited to about 1.025. Consequently, over 75 stages of centrifugal compression would be necessary to bring the pressure of hydrogen up to 1,700 p.s.i.g. starting from a pressure of 200 p.s.i.g. On the other hand two stages of a reciprocating positive displacement compressor could increase the pressure from 200 p.s.i.g. to 1,700 p.s.i.g. Thus, in spite of their problems previously discussed, reciprocating compressors have heretofore been used in bringing high purity hydrogen to high pressure.

SUMMARY OF THE INVENTION

The present invention is based partly upon the determination that in many instances it it advantageous in hydrogen manufacture to compress the hydrogen gas using centrifugal compressors prior to the final CO shift conversion steps. Thus, according to a broad embodiment of the present invention a process is provided for producing high pressure hydrogen which comprises:

(a) generating a hydrogen-rich gas stream containing CO and/or CO–$CO_2$ mixtures;
(b) centrifugally compressing the hydrogen-rich gas stream to a pressure above 400 p.s.i.g.; and
(c) reacting CO contained in the compressed hydrogen-rich gas stream with $H_2O$ so as to obtain hydrogen and $CO_2$.

In a particularly preferred embodiment of the present invention the $CO_2$ is substantially completely removed prior to centrifugal compression of the hydrogen-rich gas. Subsequent to the compression of the $CO_2$-lean, hydrogen-rich gas, CO contained in the $CO_2$-lean, hydrogen-rich gas stream is reacted with $H_2O$ so as to produce additional hydrogen. Reacting CO with $H_2O$ at the elevated pressure obtained by centrifugally compressing the hydrogen-rich gas containing CO is beneficial for the CO shift conversion reaction. For a given amount of shift conversion catalyst at a given gas rate in terms of standard cubic feet per unit time, the residence time of the CO in contact with the shift conversion catalyst mass is greater at the higher pressures attained by centrifugal compression according to the present invention.

Thus, an important feature of the present invention is the fact that the CO left in the $CO_2$-lean, hydrogen-rich gas operates to raise the average molecular weight of the hydrogen-rich gas so that centrifugal compression is feasible. As described in our copending application Ser. No. 736,520, centrifugal compression is not feasible for a high purity hydrogen gas stream. In our application Ser. No. 736,520 an invention is described wherein sufficient $CO_2$ is left remaining in the hydrogen-rich gas so that centrifugal compression becomes feasible. In the present invention sufficient CO is left in the hydrogen-rich gas so that centrifugal compression becomes feasible. Somewhat parallel to our earlier application wherein $CO_2$ is left in the hydrogen-rich gas, according to the present invention it is desirable to leave sufficient CO in the hydrogen-rich gas so that the average molecular weight of the hydrogen-rich gas mixture prior to centrifugal compression is at least 4. Preferably the molecular weight of the gas mixture prior to centrifugal compression is about 6 or 8 or higher. The disclosure of our application Ser. No. 736,520 is incorporated by reference into the present specification.

In a preferred embodiment of the present invention the $CO_2$-lean, hydrogen-rich gas stream containing CO is compressed from a pressure less than about 500 p.s.i.g. to a pressure between about 900 and 5,000 p.s.i.g. After the $CO_2$-lean, hydrogen-rich gas is compressed to the elevated pressure the CO in the hydrogen-rich gas is reacted with $H_2O$, that is shift converted, to produce additional hydrogen. Preferably the shift conversion is carried out at a temperature below about 550° F. In carrying out the CO shift conversion at a temperature below about 550° F. it is preferable to use a copper-zinc oxide low temperature shift conversion catalyst, such as described in U.S. Pat. 3,303,001. Preferably the low temperature shift conversion reaction is carried out at a temperature between 300 and 550° F.

As indicated previously, in the process of the present invention it is preferred to remove $CO_2$ prior to the centrifugal compression. In most instances the majority of the $CO_2$ is removed prior to the centrifugal compression. In accordance with the present invention, it is preferred to remove at least 90 percent of the $CO_2$ present in the hydrogen-rich gas prior to centrifugal compression. The removal of the $CO_2$ affords a substantial benefit in the shift conversion reaction. The shift conversion reaction is: $CO + H_2O \rightarrow H_2 + CO_2$. Thus it can be seen that when less $CO_2$ is present, there are less moles of gas on the right hand side of the equation, that is, the product side, and the reaction more readily goes in the direction of forming hydrogen. Also, the hydrogen product purity is higher since there is less methanation via the reaction: $CO + 3H_2 \rightarrow CH_4 + H_2O$.

The hydrogen-rich gas may be generated, for example, by steam-hydrocarbon reforming. The effluent from the reformer is comprised of $H_2$, $CO_2$ and CO. The volume percent hydrogen generally is about 70 to 75 percent, the percent $CO_2$ is usually about 10 to 15 percent, and the percent CO is usually about 10 to 15 percent. The effluent also contains in most instances some nitrogen and also some methane "leakage." (It should be noted that in this specification the terms "comprise" and "contain" are used in a nonexclusive sense. Thus, when it is said that a gas stream is comprised of hydrogen, $CO_2$ and CO, this means that these gases are present but other gases may also be present along with the gases specifically named.)

Referring again to a preferred example of the present invention wherein the hydrogen-rich gas is generated by steam reforming, if about 90 percent of the $CO_2$ is removed prior to centrifugal compression there will be remaining about 1 to 1.5 percent $CO_2$. This in most instances would not be a sufficient amount of $CO_2$ to raise the molecular weight of the hydrogen-rich gas to about 4 so that centrifugal compression would be feasible. In the present invention, however, at least part of the CO is not shift converted prior to centrifugal compression. The CO, which has a molecular weight of 28, will raise the average molecular weight of the hydrogen-rich gas so that centrifugal compression is feasible.

In most instances it is preferable to omit all shift conversion prior to centrifugal compression according to the process of the present invention. However, in some instances, it is preferable to shift convert, particularly using a high temperature shift converter a portion of the CO prior to centrifugal compression according to the process of the presentt invention If the hydrogen-rich gas contains no other impurities, about 7.7 volumes percent CO is necessary in order to raise the average molecular weight to about 4. However, due to the fact that in most instances some methane and nitrogen impurity is present the CO concentration may be reduced to about 1.5 to 5 volume percent while still maintaining an average molecular weight for the hydrogen-rich gas of at least 4. Also, trace quantities of $CO_2$ will also aid in maintaining such average molecular weight; where $CO_2$ is removed in prior $CO_2$ bulk removal step it is often more economical to design for such $CO_2$ removal on a basis which leaves in small quantities of $CO_2$. The high temperature shift conversion is preferably carried out at a temperature between about 550 to 900° F. Generally, an iron-chrome type high temperature CO shift conversion catalyst is used.

According to a preferred process embodiment of the present invention, carbon oxides in at least a portion of the effluent hydrogen-rich gas from high pressure-low temperature (below 550° F.) CO shift conversion are methanated and the resulting hydrogen-rich gas is reacted with hydrocarbons in a hydroconversion process. By "hydroconversion process" is meant any process wherein a relatively high purity hydrogen gas is reacted with hydrocarbons to improve the quality of the hydrocarbons. For example, the hydroconversion process may be a hydrodesulfurization, hydrodenitrification, hydrofining, hydrotreating, or a hydrocracking process.

According to a preferred embodiment of the present invention, hydrogen is produced at two different pressure levels. The $CO_2$-lean, hydrogen-rich gas stream containing CO is centrifugally compressed, from a pressure less than about 500 p.s.i.g. to a first presure level between about 900 and 2,000 p.s.i.g. CO contained in the compressed hydrogen is then shift converted below 550° F. A portion of the hydrogen-rich gas from the low temperature (below 550° F.) shift conversion is used in a hydroconversion process operating at the first pressure level. A remaining portion of the effluent from the low temperature shift conversion is centrifugally compressed to a second pressure level between about 1,200 and 5,000 p.s.i.g. and at least about 300 p.s.i. higher than the first pressure level. In a preferred embodiment of this mode of operation, carbon oxides in the hydrogen-rich gas compressed to the second pressure level are methanated and the resulting hydrogen-rich gas is reacted with hydrocarbons in a hydroconversion process operated at pressures between about 1,200 and 5,000 p.s.i.g.

By "methanation" or "methanated" is meant the reaction of CO or $CO_2$ with $H_2$ to yield $CH_4$ and $H_2O$. The operation parameters of the methanation process and the type of catalyst used for methanation are well known in the art. It is advantageous to carry out the methanation reaction at elevated pressures, such as pressures as high as 1,200 to 5,000 p.s.i.g.

It is apparent that the present invention may be advantageously combined with our earlier disclosure in Ser. No. 736,520, as well as our disclosures in our applications Ser. No. 788,262, entitled "Hydrogen Manufacture with Integrated Steam Usage," filed Dec. 31, 1968, and Ser. No. 788,299, "Centrifugal Compression of Hydrogen to Two Pressure Levels," filed Dec. 31, 1968. Our disclosures in the above-mentioned patent applications are incorporated by reference into the present specification.

BRIEF DESCRIPTION OF THE DRAWING

The drawing is a schematic flow diagram of the preferred embodiment of the invented hydrogen manufacturing process with CO shift conversion subsequent to centrifugal compression.

DETAILED DESCRIPTION

Referring now in more detail to the embodiment of the invention shown in the drawing, light hydrocarbon in line 1 is combined with low pressure steam in line 2 and introduced to reforming furnace 3 for reaction to produce a hydrogen gas. Typically the light hydrocarbon is natural gas comprised mostly of methane. The natural gas is desulfurized using activated carbon to adsorb sulfur compounds. If excessive sulfur compounds remain in the feed, the nickel catalyst which is typically used to speed up the kinetics of the reaction of methane with $H_2O$ is poisoned.

Generally the reforming reaction in furnace 3 takes place at a pressure of about 300 p.s.i.g. and a temperature of about 1500° F. Thus there is substantial heat present in the hydrogen-rich gas containing $CO_2$ and CO withdrawn from reforming furnace 3 via line 4. This heat is removed by boiler feed water (BFW) introduced via line 6 to boiler 5. Steam is withdrawn from the boiler via line 7. The cooled gases are withdrawn from the boiler via line 8.

The hydrogen-rich gases are withdrawn from boiler 5, passed through a separator to remove water and then introduced to bulk $CO_2$ removal zone 9. $CO_2$ is removed from the hydrogen-rich gas using a physical absorbent, such as propylene carbonate. The hydrogen-rich gas removed via line 10 from bulk $CO_2$ removal zone 9 typically contains about 80 mole percent hydrogen, 15 mole percent CO, 1 to 2 percent $CO_2$ and the balance methane and nitrogen. This gas is then passed to centrifugal compressor 18 at a pressure of about 300 p.s.i.g. Centrifugal compressor 18 compresses the gas to a pressure of about 1,500 p.s.i.g.

The hydrogen-rich gas stream is removed from the centrifugal compressor via line 22 and introduced to low temperature shift conversion zone 11 operating at a temperature between about 350 and 500° F. Because of the high pressure, in some instances a significantly lower temperature may be found satisfactory for a low temperature shift conversion in zone 11. In most instances low temperature shift conversion is carried out according to practices presently employed in the art for low temperature shift conversion, except that the pressure is markedly higher according to the present process. Normal pressures employed for low temperature shift conversion are below about 300 p.s.i.g. In the present process the shift conversion in zone 11 is operated at about three to five times or more the normal pressure employed in the past.

The low temperature used for the shift conversion reaction according to the present process favors the equilibrium of the reaction in the direction of more product hydrogen. Also, the reduction of $CO_2$ by bulk removal $CO_2$ zone 9 favors the reaction in the direction of more product hydrogen.

The shift converted gases are withdrawn from low temperature shift conversion zone 11 via line 12. The volume percent CO present in the effluent gases from low temperature shift conversion zone 11 is generally about 0.9 volume percent or lower. In shift conversion zone 11 additional $CO_2$ is formed which is removed in $CO_2$ removal zone 23. Preferably a physical absorbent is used to remove the $CO_2$ from the 1500 p.s.i.g. hydrogen-rich gas. As described in our application Ser. No. 736,520, it is particularly advantageous to remove the $CO_2$ at high pressure using a physical absorbent.

The hydrogen-rich gas stream is withdrawn from $CO_2$ removal zone 23 via line 24. This product hydrogen gas stream contains only residual amounts of carbon oxides and is available for use at high pressures, that is, about 1,500 p.s.i.g.

One preferred use for the product hydrogen is in a hydroconversion unit such as shown in the drawing. The hydroconversion unit in this instance will be one operating at a pressure of about 1,500 p.s.i.g. In most instances the residual carbon oxides are removed by scrubbing with an absorbent or by methanation prior to introduction to hydroconversion unit 26. Product hydrocarbons are withdrawn from hydroconversion unit 26 via line 27.

As indicated above, in certain preferred embodiments of the present invention hydrogen is produced at two pressure levels. Thus referring to the drawing, part of the hydrogen removed from $CO_2$ removal zone 23 may be passed via line 31 to centrifugal compressor 33 for compression to a higher pressure, as for example, 4,000 p.s.i.g. In some instances the CO or the $CO_2$ removal or both are preferably adjusted so as to adjust the average molecular weight of the hydrogen-rich gas fed to the centrifugal compressor 33. In other instances it is preferable to inject a light hydrocarbon so as to raise the molecular weight of the hydrogen gas to centrifugal compressor 33 to at least 4 so as to make centrifugal compression feasible. It should be noted that since the centrifugal compression becomes more feasible or more practical as the molecular weight is raised (counterbalanced by added compression costs), in some instances, it will be desirable to inject a small amount of light hydrocarbons via line 30 even if the molecular weight of the hydrogen gas is about 4 due to residual carbon oxides and other impurities in the hydrogen gas. The light hydrocarbons may be injected from an extraneous source or they may be obtained from one or both of the hydroconversion units operating at elevated pressures. As explained in our copending application entitled "Centrifugal Compression of Hydrogen to Two Pressure Levels" it is generally advantageous to obtain the light hydrocarbons from the gas recovery section of hydroconversion unit 38 operating at the second pressure level. This is because in many instances light hydrocarbons are available from unit 38 at a sufficiently high pressure so that little or no compression is needed in order to inject the light hydrocarbons into the hydrogen-rich feed gas for compressor 33.

In a particularly preferred embodiment of the present invention the molecular weight of the hydrogen-rich gas fed to compressor 33 is adjusted to at least 4 by leaving sufficient CO in the effluent gas from $CO_2$ removal zone 23. In this preferred embodiment, the high pressure gases from centrifugal compressor 33 are passed via line 35 to low temperature shift conversion zone 13. Low temperature shift conversion zone 13 is operated at a pressure of about 3000 p.s.i.g. and a temperature below 550° F. A copper-zinc oxide catalyst may be used in low temperature shift conversion zone 13. The shift converted gases are withdrawn from zone 13 via line 14 and passed to $CO_2$ removal zone 36. $CO_2$ removal may be effected in zone 36 using an amine so as to reduce the $CO_2$ to very low levels. However, in most instances at the high second pressure levels the $CO_2$ is advantageously removed using a physical absorbent.

The hydrogen-rich gas containing only residual amounts of carbon oxides is passed via line 37 to hydroconversion unit 38 operating at a pressure of about 3,000 p.s.i.g. In most instances prior to introduction to hydroconversion unit 38 residual carbon oxides are removed from the hydrogen using an absorbent, such as copper ammonium acetate, or by using an adsorbent. The carbon oxides may also be removed by methanation. The high pressure, high purity hydrogen is reacted with hydrocarbons in hydroconversion unit 38 and product hydrocarbons are withdrawn via line 39.

As shown in the drawing, the centrifugal compressors are preferably driven by steam turbines. Steam for driving the compressor turbine drivers is preferably generated in reforming furnace 3. Boiler feed water is introduced via line 21 to the convection section of reformer furnace 3. High pressure steam generated in the reforming furnace is passed via lines 20 and 28 to the inlet of the turbine drivers.

Exhaust steam from the turbines is removed via lines 2 and 2a and is combined with light hydrocarbons fed to the reforming furnace. Thus, the exhaust steam from the turbine is used as process steam for reaction with the light hydrocarbons to produce hydrogen and carbon oxides in reforming furnace 3.

Although various specific embodiments of the invention have been described and shown, it is to be understood they are meant to be illustrative only and not limiting. Certain features may be changed without departing from the spirit or essence of the invention. It is apparent that the present invention has broad application to hydrogen production wherein CO is not completely removed prior to centrifugal compression of the hydrogen-rich gas to an elevated pressure. Accordingly, the invention is not to be construed as limited to the specific embodiments illustrated but only as defined in the appended claims.

We claim:

1. A process for producing high pressure hydrogen which comprises:
   (a) generating a hydrogen-rich gas containing CO and $CO_2$ with sufficient CO so that the molecular weight of the hydrogen-rich gas is at least 4;
   (b) removing $CO_2$ from the hydrogen-rich gas but leaving sufficient CO in the hydrogen-rich gas to obtain a $CO_2$-lean, hydrogen-rich gas having a molecular weight of at least 4;
   (c) centrifugally compressing the hydrogen gas from a pressure less than about 500 p.s.i.g. to a pressure between about 900 and 5,000 p.s.i.g., before the molecular weight of the hydrogen gas mixture is reduced below 4 by CO shift conversion and $CO_2$ removal, to obtain a compressed $CO_2$-lean, hydrogen-rich gas stream;
   (d) reacting CO contained in the compressed $CO_2$-lean, hydrogen-rich gas stream with $H_2O$ at a pressure above about 400 p.s.i.g., to obtain additional $H_2$ and $CO_2$ in the compressed hydrogen-rich gas stream; and
   (e) removing or methanating $CO_2$ present in the compressed hydrogen-rich gas stream to obtain a product high pressure hydrogen gas.

2. A process according to claim 1 wherein the CO is reacted with $H_2O$ (shift converted) to produce additional $H_2$ subsequent to centrifugal compression at a temperature below about 550° F.

3. A process according to claim 2 wherein the CO is reacted with $H_2O$ at a temperature between 300 and 550° F. using a copper-zinc oxide low temperature shift conversion catalyst.

4. A process in accordance with claim 1 wherein at least 90 percent of the $CO_2$ present in the hydrogen-rich gas generated in accordance with step (a) is removed from the hydrogen-rich gas prior to centrifugal compression, and wherein the CO is shift converted with $H_2O$ in accordance with step (d) at a temperature below about 550° F. to produce additional $H_2$ subsequent to centrifugal compression.

5. A process according to claim 4 wherein the hydrogen-rich gas stream is generated by steam-hydrocarbon reforming.

6. A process in accordance with claim 1 wherein CO contained in the generated hydrogen-rich gas is reacted with $H_2O$ at a temperature between 550 and 900° F. prior to $CO_2$ removal in accordance with step (b) and wherein at least 90 percent of the $CO_2$ in the hydrogen-rich gas is removed from the hydrogen-rich gas prior to centrifugal compression, and wherein CO is shift converted with $H_2O$ at a temperature below about 550° F. to produce additional $H_2$ subsequent to centrifugal compression.

7. A process in accordance with claim 1 wherein CO contained in the generated hydrogen-rich gas is reacted with $H_2O$ at a temperature between 550 and 900° F. prior to $CO_2$ removal in accordance with step (b) and wherein at least 90 percent of the $CO_2$ in the hydrogen-rich gas is removed from the hydrogen-rich gas prior to centrifugal compression, and wherein CO is shift converted with $H_2O$ at a temperature below about 550° F. to produce additional $H_2$ subsequent to centrifugal compression, and wherein residual carbon oxides in at least a portion of the effluent hydrogen-rich gas from CO shift conversion at a temperature below 550° F. are methanated and the resulting compressed $CO_2$-lean hydrogen-rich gas is suitable for reaction with hydrocarbons in a hydroconversion process.

References Cited

UNITED STATES PATENTS

| | | | |
|---|---|---|---|
| 2,934,407 | 4/1960 | Simonek et al. | 23—213 |
| 3,120,993 | 2/1964 | Thormann et al. | 23—2 |
| 3,297,408 | 1/1967 | Marshall, Jr. | 23—213X |
| 3,361,534 | 1/1968 | Johnson et al. | 23—213 |
| 3,390,102 | 6/1968 | Reitmeier | 23—213 |
| 3,401,111 | 9/1968 | Jackson | 208—108 |
| 3,418,082 | 12/1968 | Ter Haar | 23—213 |
| 3,420,633 | 1/1969 | Lee | 23—210 |

FOREIGN PATENTS

| | | | |
|---|---|---|---|
| 848,613 | 9/1960 | Great Britain | 23—213 |

EDWARD STERN, Primary Examiner

U.S. Cl. X.R.

23—210; 208—108